(12) United States Patent
Dennis et al.

(10) Patent No.: US 9,990,118 B1
(45) Date of Patent: Jun. 5, 2018

(54) DYNAMIC MANAGEMENT AND DISPLAY OF MOBILE APPLICATION INSTALLATION SHORTCUTS

(71) Applicant: Sprint Communications Company L.P., Overland Park, KS (US)

(72) Inventors: Drew T. Dennis, Gardner, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 284 days.

(21) Appl. No.: 14/960,338

(22) Filed: Dec. 4, 2015

(51) Int. Cl.
    *G06F 3/00* (2006.01)
    *G06F 3/0484* (2013.01)

(52) U.S. Cl.
    CPC ...... *G06F 3/04842* (2013.01); *G06F 3/04847* (2013.01)

(58) Field of Classification Search
    CPC ............. G06F 8/61; G06F 9/54; G06F 1/1626
    See application file for complete search history.

(56) References Cited

U.S. PATENT DOCUMENTS

| 8,745,617 | B1* | 6/2014 | Stekkelpak | ......... | G06F 9/44505 717/173 |
| 9,098,366 | B1 | 8/2015 | Adib et al. | | |
| 2012/0084773 | A1* | 4/2012 | Lee | ............ | G06F 8/61 717/178 |
| 2012/0089974 | A1* | 4/2012 | Cho | ........... | G06F 8/61 717/173 |
| 2013/0332886 | A1* | 12/2013 | Cranfill | ................ | G06F 3/0482 715/835 |
| 2013/0337873 | A1* | 12/2013 | Yang | ..................... | G06F 9/4443 455/566 |
| 2014/0196026 | A1* | 7/2014 | Seo | ......... | H04N 5/445 717/178 |
| 2014/0223423 | A1* | 8/2014 | Alsina | ..................... | G06F 8/65 717/173 |
| 2016/0103668 | A1* | 4/2016 | Srinivasan | ............... | G06F 8/61 717/178 |
| 2016/0357536 | A1* | 12/2016 | Firlik | ...................... | G06F 9/54 |

* cited by examiner

*Primary Examiner* — Linh K Pham

(57) ABSTRACT

A user equipment (UE), comprising a display, a processor, a non-transitory memory, a geometry file, a plurality of application descriptors stored in the non-transitory memory, and an application installation shortcut manager stored in the non-transitory memory. Each application descriptor comprises a thumbnail image of an associated application and a uniform resource locator (URL) that identifies a location from which the application can be downloaded. The shortcut manager application presents a thumbnail image of an application descriptor in the display based on the geometry file for a predetermined period of time, receives a selection input for a currently displayed thumbnail image of one of the application descriptors, and downloads and installs the application associated with the selection input on the UE.

12 Claims, 8 Drawing Sheets

DYNAMIC MANAGEMENT AND DISPLAY OF MOBILE APPLICATION INSTALLATION SHORTCUTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User equipment (UE) such as mobile phones and smart phones may be capable of running a plurality of software applications. Software applications include social media applications, weather applications, sports applications, gaming applications, map applications, and a wide variety of other applications. Executing software applications may provide a user of the UE with functionality that would be otherwise unavailable or inconvenient on the UE. For example, the user may find it convenient to use a software application to directly access a social media site rather than accessing the social media site manually by searching the internet. Software applications may be installed at the time of manufacture or by the user of the UE.

SUMMARY

In an embodiment, a method of installing an application on a user equipment (UE) is disclosed. The method comprises receiving a geometry file from a server by the UE, wherein the geometry file is specific to a model of the UE and installing a plurality of application descriptors on the UE, where each of the application descriptors comprises a thumbnail image of an associated application and a uniform resource locator (URL) that identifies a location from which the associated application can be downloaded. The method further comprises presenting the thumbnail image of a first one of the application descriptors for a predetermined period of time in a display of the UE, where the thumbnail image of the first one of the application descriptors is presented based on the geometry file, removing the thumbnail image of the first one of the application descriptors from the display, and presenting the thumbnail image of a second one of the application descriptors for the predetermined period of time on the display of the UE, where the thumbnail image of the second one of the application descriptors is presented based on the geometry file. The method further comprises receiving a selection input for one of the thumbnail images and downloading and installing an application associated with the selection input of the thumbnail image on the UE.

In an embodiment, another method of installing an application on a user equipment (UE) is disclosed. The method comprises receiving a geometry file from a server, wherein the geometry file is specific to a model of the UE, and installing a plurality of application descriptors on the UE, where each application descriptor comprises a thumbnail image of an application and a uniform resource locator (URL) that identifies a location from which the application can be downloaded. The method further comprises presenting a folder thumbnail image linked to at least some of the plurality of application descriptors for a predetermined period of time on the UE and receiving a selection input for the folder thumbnail image. The method further comprises, responsive to receiving the selection input, presenting a thumbnail image of each of the application descriptors linked to the selected folder thumbnail image on the UE, receiving a selection input for one of the application descriptor thumbnail images, and downloading and installing the application associated with the selection input for the one of the application descriptor thumbnail images.

In yet another embodiment, a user equipment (UE) is disclosed. The UE comprises a display, a processor, a non-transitory memory, and a geometry file, stored in the non-transitory memory, wherein the geometry file is specific to a model of the UE. The UE further comprises a plurality of application descriptors, stored in the non-transitory memory, wherein each application descriptor comprises a thumbnail image of an associated application and a uniform resource locator (URL) that identifies a location from which the application can be downloaded and an application installation shortcut manager application stored in the non-transitory memory. When executed by the processor, the application installation shortcut manager application presents the thumbnail image of a first one of the application descriptors in the display based on the geometry file for a predetermined period of time, removes presentation of the thumbnail image of the first one of the application descriptors after the end of the predetermined period of time, and presents the thumbnail image of a second one of the application descriptors in the display based on the geometry file after removal of presentation of the thumbnail image of the first one of the application descriptors. The application further receives a selection input for a currently displayed thumbnail image of one of the application descriptors and downloads and installs the application associated with the selection input on the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
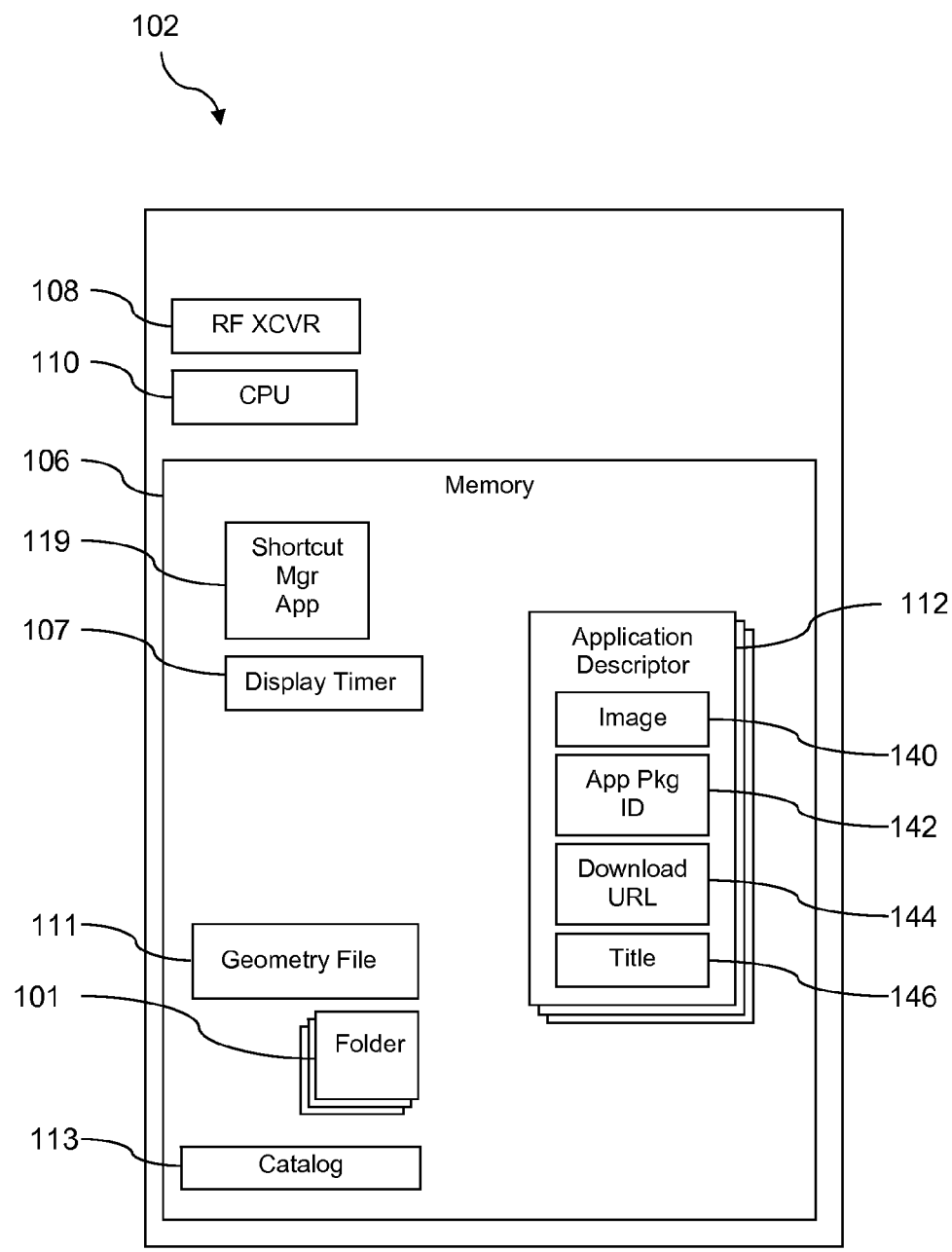
FIG. 1 is a block diagram of a UE according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for managing and displaying mobile application installation shortcuts and for downloading and installing mobile applications in response to user selection of these shortcuts is taught herein. Mobile applications may be installed on a user equipment (UE) or a mobile communication device (e.g., on a smart phone) by the user or may be pre-installed at the time of device manufacture. The user may be more likely to use a given mobile application if it is pre-installed on the UE, hence mobile application providers may desire to have their applications pre-installed on UEs. On the other hand, users may not want a large number of applications pre-installed on their device because the application icons may clutter the device control screen and consume device memory. It may be the case that when a large number of mobile applications are pre-installed on a mobile device, the user may never use most of those pre-installed applications.

The present disclosure teaches presentation of mobile application installation shortcuts as an alternative to pre-installation of applications. A plurality of icons or thumbnail images each representing different mobile applications may be presented on the mobile device control/display screen in rotation (e.g., 10 seconds per icon) in the same location. When a user selects a presented icon or thumbnail image, the associated mobile application is downloaded and installed on the mobile device. In an embodiment, when the user selects a presented icon, an application installation wizard may be presented on the display which the user may use to effect the downloading and installation of the subject mobile application on the device. The icons or thumbnail images may be referred to as mobile application installation shortcuts. Each of the mobile application installation shortcuts may be said to comprise (1) a thumbnail image that may be presented on the display of the mobile device, (2) an application package identity, (3) a download uniform resource locator (URL), and (4) a textual title. In some contexts, the mobile application installation shortcuts may be referred to as application descriptors. An application (e.g., a mobile application installation shortcut management application), a widget (e.g., a 1×1 Android widget), or operating system of the device manages the sequencing of the presentation of thumbnail images and the handling of the user inputs to the icon and/or the installation wizard. This innovation may enhance user adoption and use of mobile applications without unnecessarily cluttering the user's display or consuming device memory with unwanted applications.

By presenting a plurality of shortcuts in a single location on the display in a rotating manner (for a first period of time, a first mobile application shortcut or icon is presented; after the end of the first period of time, a second shortcut is presented for a second period of time; after the end of the second period of time, a third shortcut is presented for a third period of time; after the end of the third period of time, the first shortcut is presented again for a fourth period of time, etc.) display clutter is avoided. The mobile application installation shortcut management application or widget may receive a geometry file from a server, and store the geometry file in a memory of the UE. The geometry file is specific to the model of the UE and defines the configurations of mobile application thumbnail images that represent the mobile applications on the display of the UE. For example, the geometry file may define the fonts, the margins, and the sizes of the application thumbnail images. The shortcut management application, the widget, and/or the UE checks the geometry file and presents the mobile application thumbnail images based on the geometry file. As a result, the application thumbnail images look substantially similar to the images that will represent the mobile applications if it is installed on the UE.

In an embodiment, a plurality of application thumbnail images are presented in the same location on the display of the UE according to a predetermined order. The predetermined order is defined in a catalog by a content management server. The catalog may be downloaded to the UE and stored in the memory of the UE by the shortcut management application or widget. The catalog may comprise a list of application descriptors. At any time, only one of the thumbnail images is presented in the same location on the display of the UE. Specifically, a shortcut icon is presented in the display of the UE for a predetermined period of time (e.g., 3 seconds) before the following shortcut icon in the catalog is presented in the same location on the display of the UE, and so on. In an embodiment, the predetermined period of time may be defined by the content management server in the catalog, for example defined in an application descriptor associated with the shortcut. Alternatively, the predetermined period of time may be defined by the shortcut management application or widget, for example based on a user input configuring this time duration. After the last shortcut icon of the plurality of the shortcut icons is presented for the predetermined period of time, the first shortcut icon of the plurality of shortcut icons is presented.

In an embodiment, the shortcut management application and/or widget rotates the presented shortcut icon through a small number of application descriptors at the top of the catalog. For example, the catalog may comprise 20 application descriptors, 50 application descriptors, 100 application descriptors, or more. The shortcut management application or widget may display shortcut icons, one at a time, selected from the three application descriptors at a top of the catalog, the five application descriptors at the top of the catalog, or some other subset of application descriptors contained in the catalog. The catalog may be updated periodically and the order of application descriptors in the catalog may be updated. Thus, the top listed application descriptors and hence the thumbnail images and/or icons of mobile applications presented may be changed periodically.

In an embodiment, only one shortcut icon or thumbnail image is presented in the location on the display of the UE constantly until it is selected by a user for installation. This shortcut icon may be changed occasionally, for example when a new catalog is downloaded to the UE (e.g., once per day, once per week, or some other time interval). In an embodiment, one shortcut icon or thumbnail image is presented in the location on the display of the UE constantly during a particular time of day. For example, the same shortcut icon may be displayed during working hours and a different shortcut icon may be displayed after working hours. Yet another shortcut icon may be displayed during a weekend.

In an embodiment, rather than a periodic display of application thumbnail images presented in the dedicated location, a single folder is presented in the dedicated location. When selected by a user, the folder opens and causes a plurality of thumbnail images to be presented on the display of the UE. The user can click on the folder to close it or can click on a thumbnail image to install the corresponding full application on the UE.

In an embodiment, a plurality of folders represented by a plurality of folder thumbnail images are presented in the same location on the display of the UE according to a predetermined order. The predetermined order may be defined in the catalog by the content management server. Each folder is linked to a plurality of mobile applications and/or shortcuts with common characteristics. At any time, only one of the folders is presented in the same location on the display of the UE. Specifically, a folder is presented in the display of the UE for a predetermined period of time (e.g., 3 seconds) determined by the content management server before the following folder in the catalog is presented for the predetermined period of time in the same location on the display of the UE, and so on. After the last folder of the plurality of the folders is presented for the predetermined period of time, the first folder of the plurality of folders is presented in the same location on the display of the UE. In response to a user selection of one of the folder thumbnail images, all the shortcut icons in the corresponding folder are presented at the same time on the display of the UE. In another embodiment, only one folder represented by a folder thumbnail image is presented in the location on the display of the UE constantly until it is selected by a user.

In an embodiment, a plurality of shortcut icons and folders are presented in the same location on the display of the UE according to a predetermined order. Each of the shortcut icons is represented by an application thumbnail image, and each of the folders is represented by a folder thumbnail image. The predetermined order may be defined in the catalog by the content management server. At any time without any selection input, either a shortcut icon or a folder is presented in the same location on the display of the UE. Specifically, a shortcut icon or a folder is presented in the display of the UE for a predetermined period of time (e.g., 3 seconds) before the following shortcut icon or folder is presented for the predetermined period of time (e.g., 3 seconds) in the same location of the UE, and so on. In an embodiment, the predefined period of time may be defined in the catalog. After the last shortcut icon or folder of the plurality of shortcut icons and folders is presented for the predetermined period of time (e.g., 3 seconds), the first shortcut icon or folder of the plurality of shortcut icons and folders is presented in the same location on the display of the UE. After a user selects a folder thumbnail image, all the shortcuts represented by the application thumbnail images in the corresponding folder are presented at the same time on the display of the UE.

After a user selected installation of a mobile application (e.g., user selects the shortcut associated with the mobile application, and the shortcut management application, the widget, the operating system, and/or the installation wizard downloads and installs the subject mobile application), the shortcut management application or the widget accesses the catalog in the memory of the UE. In some examples, the shortcut management application or widget moves the corresponding application descriptor to the bottom of the catalog. In some other examples, the shortcut management application widget marks the application descriptor in some way to indicate that it has been installed on the UE or that its display priority is low.

In an embodiment, besides the application thumbnail images and/or the folder thumbnail images presented in the same location on the display of the UE, a plurality of the interactive virtual pre-load thumbnail images as described in U.S. patent application Ser. No. 13/940,251, filed Jul. 11, 2013, entitled "Virtual Pre-Installation of Applications," by Fared A. Adib, et al., which is incorporated by reference herein in its entirety, are also presented on the display of the UE. Under such circumstance, two catalogs are stored in the memory of the UE. A first catalog managed by the shortcut management application or widget comprises application descriptors and optionally folder. A second catalog managed by a client module includes application identifiers linked to the virtual pre-installed thumbnail images. When a corresponding mobile application is installed in response to a user selection of a shortcut or a virtual pre-installed thumbnail image, an operating system (OS) of the UE informs the shortcut management application, the widget, and the client module to search for the corresponding full application identifier of the installed mobile application in the first catalog and the second catalog, respectively. Once found, the corresponding application identifier or application descriptor is moved to the bottom of the corresponding catalog.

Turning now to FIG. 1, a UE 102 is described. In an embodiment, the UE 102 comprises a radio frequency transceiver (RF XCVR) 108, a processor 110, and a memory 106. In an embodiment, the memory 106 comprises a display timer 107, a geometry file 111, a plurality of application descriptors 112 and/or a plurality of folders 101, a catalog 113, and a shortcut manager application or widget 119. The application descriptors 112 may comprise the high priority or top listed application descriptors of the catalog 113. In an embodiment, the application descriptors 112 are not stored in the memory 106 separately from the catalog 113 but instead are accessed or read from the catalog 113 as desired. The memory 106 may comprise a set number of application descriptors 112. For example, the memory 106 may comprise about 4 application descriptors 112, about 6 application descriptors 112, about 8 application descriptors 112, about 30 application descriptors 112, or some other number of application descriptors 112.

A content management server (e.g., a server 118 described below with reference to FIG. 2) provides the plurality of application descriptors 112 and determines an order to present the icons or thumbnail images associated with plurality of application descriptors 112 listed in the catalog 113. The presentation order may be determined by an order or position of application descriptors 112 in the catalog 113 and/or by a priority indication associated with the application descriptors 112. The catalog 113 may be updated by the content management server (e.g., the server 118) periodically. For example, the catalog 113 may be updated by the content management server every day, every 5 days, every week, or every other period of time.

The UE 102 may comprise a mobile telecommunication device, a mobile phone, a smart phone, a personal digital assistant, a media player, a laptop computer, a notebook computer, a wearable computer, or other UE. In an embodiment, the shortcut manager application 119 may comprise the display timer 107 as an internal function used to manage periodic changing of thumbnail images. Alternatively, the display timer 107 may be a separate functionality provided in an execution environment of the UE 102, for example a function or utility provided by an operating system of the UE 102. In an embodiment, the components of the UE 102 described hereinabove may be provided at the time of manufacture. The display timer 107 may be any timer that configured to record an amount of time for which a shortcut or thumbnail image of an application descriptor 112 or a folder 101 has been presented on the display 130 of the UE 102.

In an embodiment, the shortcut manager application 119 may be implemented as a widget, for example as a 1×1 Android widget. In an embodiment, the shortcut manager application 119 may accomplish some of its functionality by reliance on a widget or may delegate processing that supports some of its functionality to a widget. A widget, as used herein, may be a computer program or script that is self-contained code that presents items (i.e., shortcuts or thumbnail images) on the display of the UE 102. The widget may provide functions in support of presentation of the items, such as processing triggered by user selection of a presented shortcut, timing of how long a shortcut is displayed, selection of shortcuts for display, and other processing described here. While widgets may be associated with the Android operating system, it is understood that the present disclosure contemplates accomplishing like functionality in other mobile communication device operating systems with other self-contained code entities.

In an embodiment, each of the application descriptors 112 comprise an image file 140, an application package identity 142, an application download uniform resource locator (URL) 144, and a textual title 146. In an embodiment, application descriptors 112 may further comprise a priority value that may be used by the shortcut manager application 119 to determine which shortcuts and/or thumbnail images to present in the display 130. In an embodiment, the application descriptors 112 may further comprise a predefined or predetermined period of time during which the associated shortcut may be displayed by the shortcut manager application 119 (i.e., the shortcut manager application 119 determines the predefined period of time for displaying the shortcut based on reading this element of the application descriptor 112). In an embodiment, the application descriptors 112 may further comprise information indicating when a shortcut may be displayed, for example during a workday, during a weekend, at night, etc. The image file 140 provides data that may be rendered to present the thumbnail image or icon associated with a mobile application. The image file 140 is rendered, for example by or on behalf of the shortcut manager application 119, based on the geometry file 111. The download URL 144 may provide a handle or address from which the shortcut manager application 119 may download a mobile application. The download URL 144 may in part identify the content management server 118 and/or the mobile application repository 120. The textual title 146 may be a human readable title of the associated mobile application which may be presented, for example, on the display of the UE 102 when a user selects or hovers over the thumbnail image of the application descriptor 112.

In an embodiment, the UE 102 receives a geometry file 111 from a server (e.g., the content management server 118) and stores the geometry file 111 in the memory 106. The geometry file 111 is specific to the model of the UE 102 and defines, in part, how the thumbnail images, icons, or shortcuts are to be rendered and presented on the display of the UE 102. For example, the geometry file 111 may define the fonts, the margins, and the sizes of the application thumbnail images. Table 1 is an example of the geometry file 111 in the "JSON" format. The geometry file may also be referred to as a "JSON" file, which may be different for each model of the UE 102. The geometry file 111 may be requested by the shortcut manager application 119 from the application content management server 118. The request may identify the manufacturer and model of the UE 102. The request may further identify a software version of the UE 102 and/or a hardware version of the UE 102. The geometry file 111 may be particular to the specific UE 102. For example, a geometry file 111 provided to a first UE 102 may be different from the geometry file 111 provided to a second UE 102, when the first and second UE 102 are different models and/or are produced by different manufacturers.

TABLE 1 an example of the geometry file

| | |
|---|---|
| 1 | file name: conf-samsung-sm-g925p-69x70.json |
| 2 | Content: |
| 3 | { |
| 4 | "fontFamily": "sans-serif", |
| 5 | "backgroundOn": false, |
| 6 | "cellWidth": 85.0, |
| 7 | "iconMarginTop": 2.0, |
| 8 | "iconSize": 45.0, |
| 9 | "labelPaddingBottom": 6.0, |
| 10 | "labelPaddingTop": 4.0, |
| 11 | "numLabelLines": 2, |
| 12 | "textSize": 14.0 |
| 13 | } |

When presenting the thumbnail image and/or icon associated with an application descriptor 112 (i.e., when rendering the image file 140), the UE 102 checks the geometry file 111 and presents the application thumbnail image based on the geometry file 111. As a result, the application thumbnail images 150 look substantially similar to the images that will represent a selected mobile application when it is later installed on the UE 102. When the geometry file 111 is not available, the application thumbnail images 150 are presented according to a default display configuration file. The default display configuration file may be defined and uploaded in the UE 102 at the time of manufacture.

Selection of a presented application thumbnail image may cause the associated mobile application to be installed. In some contexts the presented application thumbnail image may be referred to as a mobile application installation shortcut. For example, selection of a thumbnail image may be detected by the operating system, and the operating system may send a message or interrupt to the shortcut manager application 119. The shortcut manager application 119 may be aware of the application descriptor 112 whose image file 140 is currently presented and may read or access the download URL 144 of the application descriptor 112. The shortcut manager application 119 may then reach out to the content management server 118 and a mobile application repository 120 addressed by the download URL 144 and download the mobile application. The shortcut manager application 119 may then install the mobile application on the UE 102. The shortcut manager application 119 may effect the downloading and installation of the selected mobile application in part using the services of a mobile application installation wizard that walks a user through some of the steps of downloading and installing a mobile application.

Figure 2:
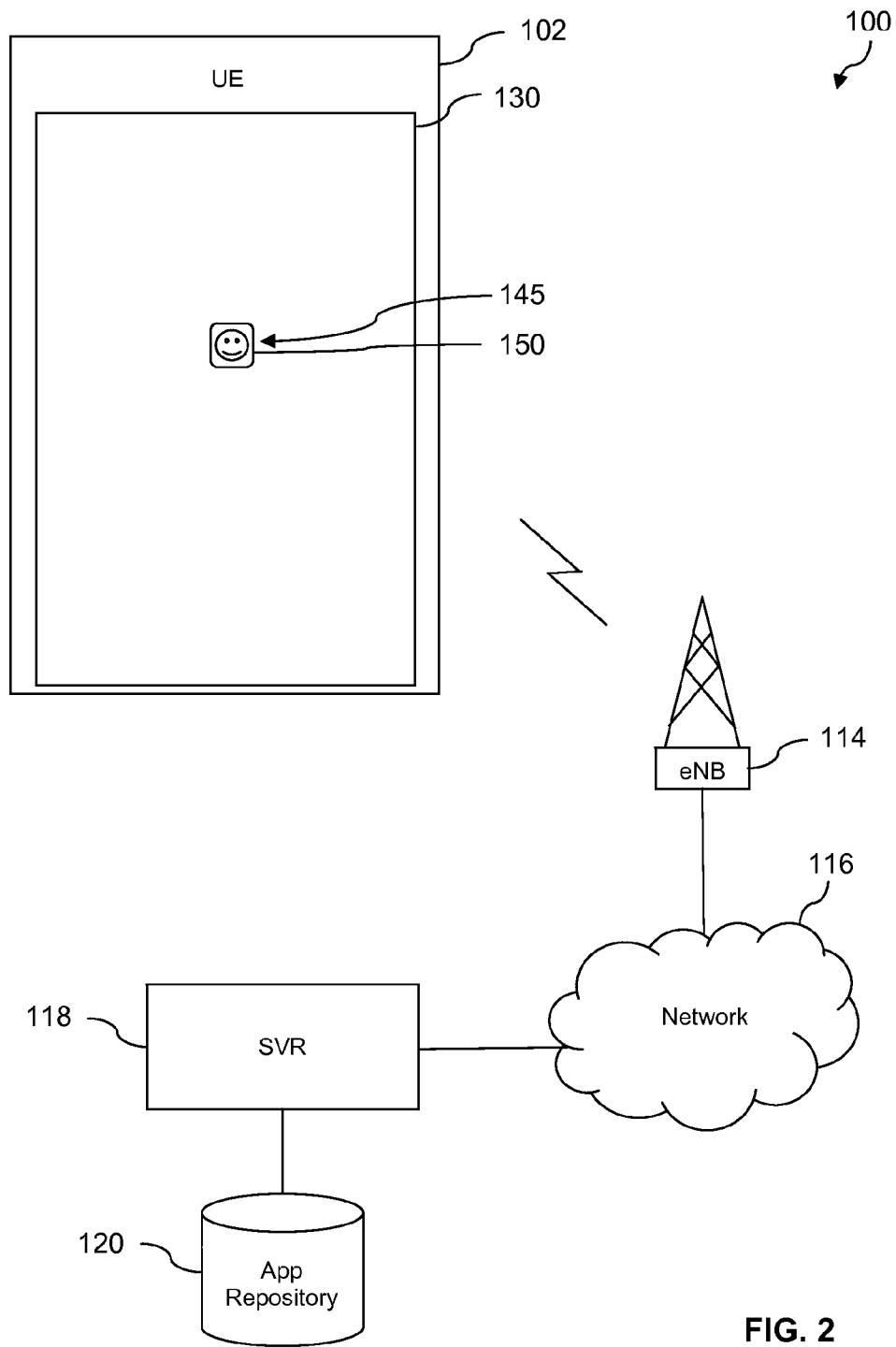
FIG. 2 is a diagram of a communication system according to an embodiment of the disclosure.

Turning now to FIG. 2, a communication system 100 is described. In an embodiment, the communication system 100 comprises the UE 102, an evolved node B (eNB) 114, a network 116, a content management server 118, and a mobile application repository 120. In an embodiment, the mobile application repository 120 may be an online application store, a service provider application store, or some other location at which mobile applications are stored. The UE 102 may be a mobile telecommunications device, for example, a smart phone, a personal digital assistant, a wearable computer, a wireless enabled laptop, a notebook, or a tablet. The UE 102 is depicted as comprising a display 130 having a location 145 where an application thumbnail image 150 or a folder thumbnail image is presented. It should be understood that the UE 102 may further comprise one or more speakers, a user interface, an antenna, a graphical user interface, one or more input/output ports, a camera, one or more buttons, one or more other features on the display 130, other components, or combinations thereof. The components of the UE 102 are described in further detail in FIG. 6, FIG. 7A, and FIG. 7B. Though the communication system 100 is shown as comprising one evolved node B 114, it is contemplated that the communication system 100 may comprise a plurality of evolved node Bs 114. The network 116 may comprise one or more private networks, one or more public networks, or a combination of private and public networks. Each of the evolved node Bs 114 may be a base transceiver system (BTS) or a cell tower. The application thumbnail images 150 are depicted as comprising a variety of common images. These images are not meant to limit the scope of the present disclosure; rather, they are representative of a wide range of images that the application thumbnail images 150 may comprise.

In an embodiment, an application thumbnail image 150 associated with one a predetermined number of the application descriptors 112 may be selected by the shortcut manager application 119 for presentation at location 145. The predetermined number of application descriptors 112 to be represented may be about 4, about 6, about 8, about 10, about 16, or some other number. The represented application descriptors 112 may be taken from the memory 106, from the mobile application repository 120 via the network 116, from another location, or from combinations thereof. Each application describer 112 may correspond to and/or reference a mobile application stored in the mobile application repository 120 and may be represented by one of the application thumbnail images 150.

In an embodiment, the application thumbnail image 150 for a given application descriptor 112 may be defined by the image file 140 of the application descriptor 112. For example, a mobile application for a social media site stored in the mobile application repository 120 may be represented by an application thumbnail image 150 of a logo for the social media site. The plurality of different application descriptors 112 may be represented by a plurality of application thumbnail images 150 each displaying a different image corresponding to the application descriptor 112 and/or mobile application that it represents.

In some contexts, representing the application descriptor 112 and representing its corresponding mobile application may be considered to be substantially similar based on visual inspection, i.e., the application thumbnail image 150 for the application descriptor 112 and the display icon associated with the mobile application when it is actually installed on the UE 102 may comprise the same image in some cases. In addition to logos, the application thumbnail image 150 for application descriptors 112 may further comprise user selected images, textual images, photographs, nature scenes, symbols, common images, animated images, cartoon images, colors, brand names, trademarks, another image configured to allow a user of the UE 102 to identify virtually preinstalled full applications, or combinations thereof.

The plurality of application descriptors 112 are linked to the catalog 113 where each of the application descriptors 112 is stored in the catalog 113. The order of the application descriptors 112 in the catalog 113 is determined by the content management server 118. In one embodiment, the order of application descriptors 112 in the catalog 113 may be determined by negotiation between mobile application distributors and an enterprise that manages the content management server 118, for example a wireless mobile communication service provider.

At any time, only one of the thumbnail images, icons, or shortcuts associated with an application descriptor 112 is presented in the same location 145 on the display 130 of the UE 102. The location 145 may be at any location on the display 130 of the UE 102, as determined by an initial configuration of the UE 102. For example, a preferred location 145 may be the center on the home screen of the UE 102 as shown in FIG. 2. Specifically, a thumbnail image defined by an image file 140 of an application descriptor 112 is presented in the display 130 of the UE 102 for a predetermined period of time (e.g., 3 seconds) determined by the content management server 118 before the thumbnail image associated with the following application descriptor 112 in the catalog 113 is presented in the same location 145 on the display of the UE 102, and so on. The predetermined period of time may be indicated in the application descriptor. The display timer 107 may watch the time. After the thumbnail image of the last application descriptor 112 of the plurality of the application descriptors 112 is presented for the predetermined period of time, the thumbnail image associated with the first application descriptor 112 of the plurality of application descriptors 112 is presented. In another embodiment, only one application thumbnail image 150 is presented in the location 145 on the display 130 of the UE 102 constantly until it is selected by a user. It is understood that this application thumbnail image 150 in this case may change when the catalog 113 is updated by a message received from the server 118.

In an embodiment, a plurality of folders 101 represented by a plurality of folder thumbnail images are presented in the same location on the display of the UE according to a predetermined order. The same location may be any location on the display 130 of the UE 102. For example, a preferred location 145 may be the center on the home screen of the UE 102 as shown in FIG. 2. The predetermined order may be defined in the catalog 113 by the content management server 118, which is stored in the memory 106 of the UE 102. For example, the plurality of folders 101 may include three folders 101 in the following order: a utility folder, a healthcare folder, and an AMAZON folder.

Each folder 101 may be linked to a plurality of application descriptors 112 with common characteristics. In some examples, a folder 101 may include a plurality of application descriptors 112 with similar functions. For example, the utility folder includes a plurality of application descriptors 112 representing utility applications such as a calculator application, a recorder application, and a compass application. For another example, the healthcare folder includes a plurality of application descriptors 112 representing healthcare related applications such as a family doctor searching application, a dentist searching application, and an insurance claiming application.

In some examples, a folder 101 may include a plurality of application descriptors 113 with the same brand or from the same company. For example, the AMAZON folder includes a plurality of application descriptors 112 representing AMAZON related applications such as an AMAZON online bookstore application, an AMAZON online cloth store application, and an AMAZON online electronic device store application.

At any time, only one of the folders 101 is presented in the same location 145 on the display 130 of the UE 102. Specifically, a folder 101 is presented in the display 130 of the UE 102 for a predetermined period of time (e.g., 3 seconds) determined by the content management server (e.g., the server 118) before the following folder 101 in the catalog 113 is presented for the predetermined period of time in the same location 145 on the display 130 of the UE 102, and so on. The display timer 107 may watch the time. After the last folder 101 of the plurality of the folders 101 is presented for the predetermined period of time, the first folder 101 of the plurality of folders 101 is presented in the same location 145 on the display 130 of the UE 102. The predetermined period of time may be indicated by the application descriptor 112.

In response to a user selection of one of the folder thumbnail images, all the application descriptors 112 in the corresponding folder 101 are presented at the same time on the display 130 of the UE 102. For example, after the user selects the healthcare folder thumbnail image when presented, all the application descriptors 112 in the healthcare folder including the family doctor searching application, the dentist searching application, and the insurance claiming application are presented at the same time on the display of the UE on the display of the UE. In another embodiment, only one folder 101 represented by a folder thumbnail image is presented in the location 145 on the display 130 of the UE 102 constantly until it is selected by a user.

In an embodiment, a plurality of application descriptors 112 and folders 101 are presented in the same location 145 on the display 130 of the UE 102 according to a predetermined order. Each of the application descriptors 112 is represented by an application thumbnail image 150, and each of the folders 101 is represented by a folder thumbnail image. The predetermined order may be defined in the catalog 113 by the content management server 118, which is stored in the memory 106 of the UE 102. For example, the plurality of application descriptors 112 and folders 101 are arranged in the following order: a watch stub application, an AMAZON folder, a healthcare folder, and a weather forecast stub application.

At any time without any selection input, either a thumbnail image of an application descriptor 112 or a folder 101 is presented in the same location 145 on the display 130 of the UE 102. The same location 145 may be any location on the display 130 of the UE 102. For example, a preferred location 145 may be the center on the home screen of the UE 102 as shown in FIG. 2. Specifically, a thumbnail image of an application descriptor 112/folder 101 is presented in the display 130 of the UE 102 for a predetermined period of time (e.g., 3 seconds) determined by the content management server 118 before the thumbnail image of the following application descriptor 112/folder 101 is presented for the predetermined period of time (e.g., 3 seconds) in the same location 145 on the display 130 of the UE 102, and so on. The display timer 107 may watch the time. After the thumbnail image of the last application descriptor 112/folder 101 of the plurality of application descriptors 112 and folders 101 is presented for the predetermined period of time (e.g., 3 seconds), the thumbnail image of the first application descriptor 112/folder 101 is presented in the same location 145 on the display 130 of the UE 102. After a user selects a folder thumbnail image, all the application descriptors 112 represented by the corresponding application thumbnail images 150 in the folder are presented at the same time on the display 130 of the UE 102.

The application descriptors 112 may be called by the application thumbnail images in the shortcut manager application 119 (or widget). The shortcut manager application 119 (or widget) may provide access to an application repository such that, in response to selecting the application thumbnail image 150, a corresponding mobile application may be downloaded and installed.

After installation of the mobile application, the shortcut manager application 119 in the memory 106 of the UE 102 accesses the catalog 113. In some examples, the shortcut manager application 119 moves the corresponding application descriptor to the bottom of the catalog 113.

In an embodiment, after a mobile application associated with an application descriptor 112 has been installed, the thumbnail image of that application descriptor 112 may be removed from the display 130 and replaced by a thumbnail image of a different application descriptor 112 according to the predetermined order of application descriptors 112 in the catalog 113. For example, when a social media mobile application is installed, the thumbnail image of the social media application be removed from the display 130 and replaced by the thumbnail image of the next application descriptor 112 in the catalog 113 which has not been presented. Replacement application descriptors 112 may be taken from the memory 106, from the mobile application repository 120 via the network 116, from another location, or from combinations thereof. Further, the application descriptors 112 may be dynamically selected for presentation according user preference, user selection, server selection, a predetermined rotation, or according to some other selection criteria.

In an embodiment, besides the application thumbnail images 150 and/or the folder thumbnail images presented in the same location 145 on the display 130 of the UE 102, a plurality of the interactive thumbnail images as described in U.S. patent application Ser. No. 13/940,251, filed Jul. 11, 2013, entitled "Virtual Pre-Installation of Applications," by Fared A. Adib, et al. are also presented on the display 130 of the UE 102.

In an embodiment, the display 130 may be a graphical user interface that provides a touch to select capability to a user of the UE 102. Selecting one of the application descriptors 112 may comprise selecting the application thumbnail image 150 associated with the application descriptor 112 by clicking on the application thumbnail image 150, invoking a touch to select functionality to select the application thumbnail image 150, or another way of selecting the application thumbnail image 150.

In an embodiment, the UE 102 schedules an expiration day for each of the application descriptors 112. For example, an expiration day for an application descriptor 112 is scheduled as the 30th day after incorporating the thumbnail image of the application descriptor 112 into the rotation. If an application thumbnail image 150 corresponding to an application descriptor 112 is not selected before its associated expiration day, the application thumbnail image 150 is replaced by another application thumbnail image 150, which represents the next stub application descriptor 112 in the catalog 113 which has not been presented.

Figure 3:
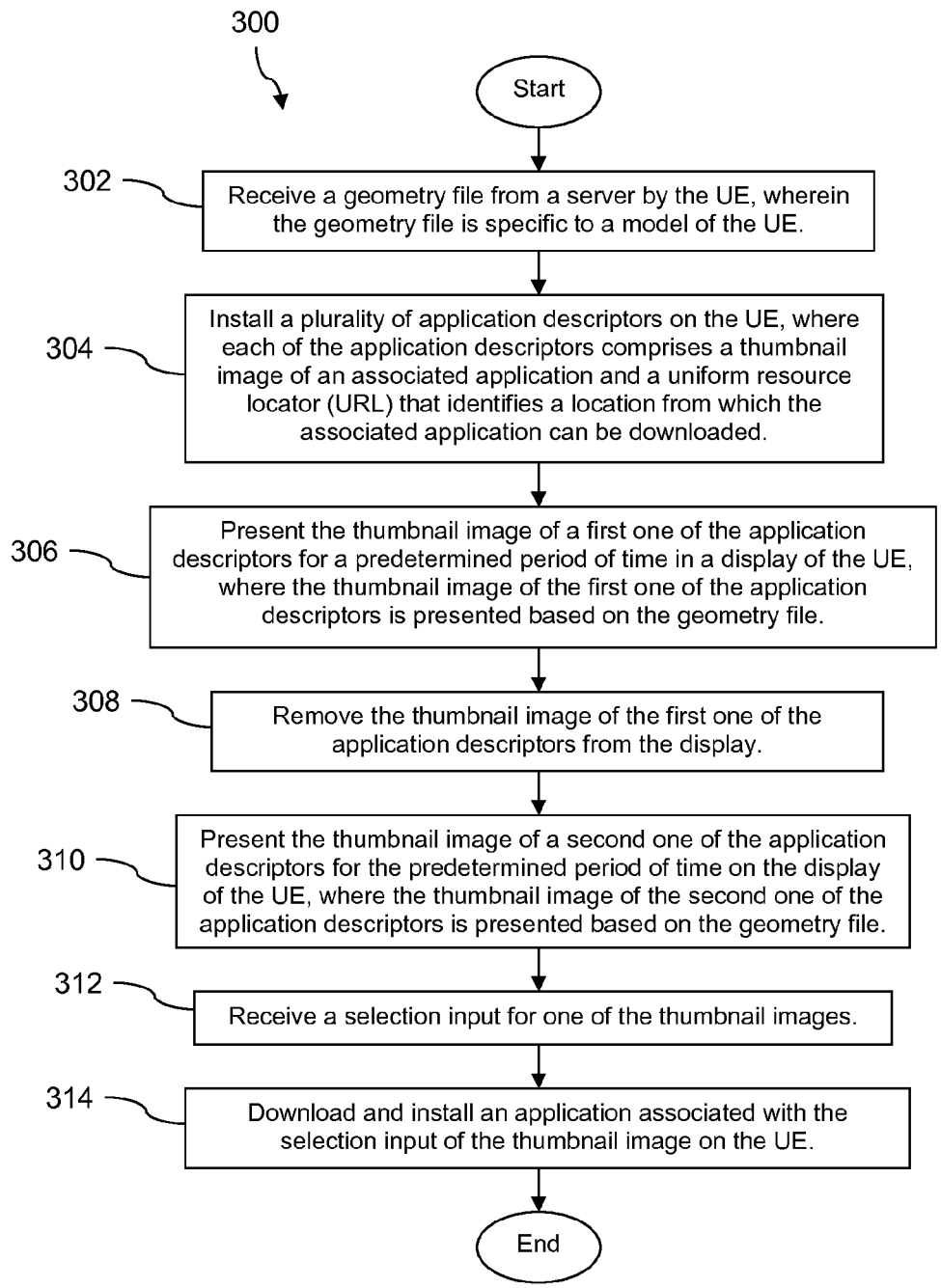
FIG. 3 is a flowchart of a method according to an embodiment of the disclosure.

Turning now to FIG. 3, a method 300 is described. At block 302, the UE 102 receives a geometry file from a server, wherein the geometry file is specific to a model of the UE. For example, the shortcut manager application 119 receives the geometry file 111 from the server 118. The shortcut manager application 119 may request the server to send the geometry file 111 and may identify in a request message the manufacturer and model of the UE 102 as well as other information such as a software version identity and/or a hardware version identity of the UE 102. At block 304, a plurality of application descriptors are installed on the UE 102, where each of the application descriptors comprises a thumbnail image of an associated application and a uniform resource locator (URL) that identifies a location from which the associated application can be downloaded. For example, the shortcut manager application 119 downloads the application descriptors 112 from the server 118.

At block 306, the thumbnail image of a first one of the application descriptors is presented for a predetermined period of time in a display of the UE 102, where the thumbnail image of the first one of the application descriptors is presented based on the geometry file. For example, the shortcut manager application 119 selects one of the application descriptors 112 and presents the thumbnail image, icon, or shortcut defined by the image file 140 on the display of the UE 102. The presentation of the subject thumbnail image is presented based on the geometry file 111, for example employing font sizes and an area of the display identified by the geometry file 111. At block 308, the thumbnail image of the first one of the application descriptors is removed from the display. For example, the shortcut manager application 119 stops presenting the thumbnail image on the display after the predetermined period of time passes. The predetermined period of time may be defined in the application descriptor 112 associated with the subject thumbnail image and/or shortcut, and the shortcut manager application 119 may learn this predetermined period of time by reading the subject application descriptor 112. At block 310, the thumbnail image of a second one of the application descriptors is presented for the predetermined period of time on the display of the UE, where the thumbnail image of the second one of the application descriptors is presented based on the geometry file. For example, the shortcut application manager 119 selects another application descriptor 112 from the catalog 113 (i.e., the next application descriptor 112 in rotation from the previous application descriptor 112) and presents the thumbnail image, icon, or shortcut defined in the image file 140 of that application descriptor. The presentation of the subject thumbnail image is presented based on the geometry file 111, for example employing font sizes and an area of the display identified by the geometry file 111.

At block 312, the UE 102 receives a selection input for one of the thumbnail images. For example, the operating system of the UE 102 detects a touch at point on a touch-screen of the UE 102 that corresponds to the location of the presentation of the thumbnail image. The operating system notifies the shortcut manager application 119. The shortcut manager application 119 interprets the touch input as a selection of the thumbnail image and hence as a user command to download and install the mobile application corresponding to the thumbnail image—that is the application descriptor 112. At block 314, the UE 102 downloads and installs an application associated with the selection input of the thumbnail image on the UE. For example, the shortcut manager application 119 uses the download URL 144 to download the mobile application associated with the application descriptor 112. The URL 144 may, in part, designate the server 118 and/or the mobile application repository 120. The shortcut manager application 119 then installs the application on the UE 102 and makes it executable and selectable by a user of the UE 102.

Figure 4:
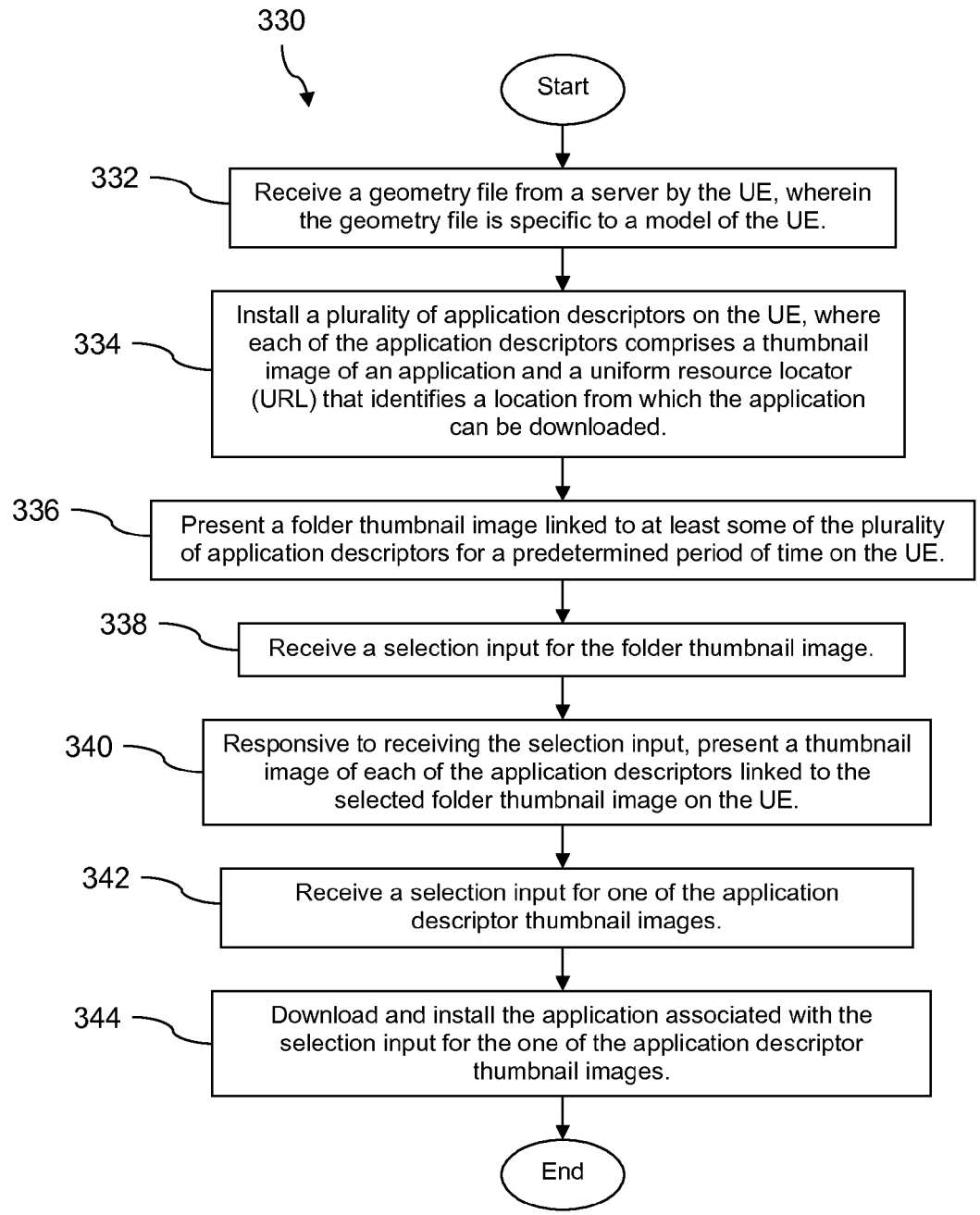
FIG. 4 is a flowchart of a method according to an embodiment of the disclosure.

Turning now to FIG. 4, a method 330 is described. At block 332, the UE 102 receives a geometry file from a server, wherein the geometry file is specific to a model of the UE 102. At block 334, the UE 102 installs a plurality of application descriptors, where each application descriptor comprises a thumbnail image of an application and a uniform resource locator (URL) that identifies a location from which the application can be downloaded. At block 336, a folder thumbnail image linked to at least some of the plurality of application descriptors is presented for a predetermined period of time on the UE 102.

At block 338, the UE 102 receives a selection input for the folder thumbnail image. At block 340, responsive to receiving the selection input, a thumbnail image of each of the application descriptors linked to the selected folder thumbnail image is presented on the UE 102. At block 342, a selection input for one of the application descriptor thumbnail images is received by the UE 102. At block 344, the UE 102 downloads and installs the application associated with the selection input for the one of the application descriptor thumbnail images.

Figure 5:
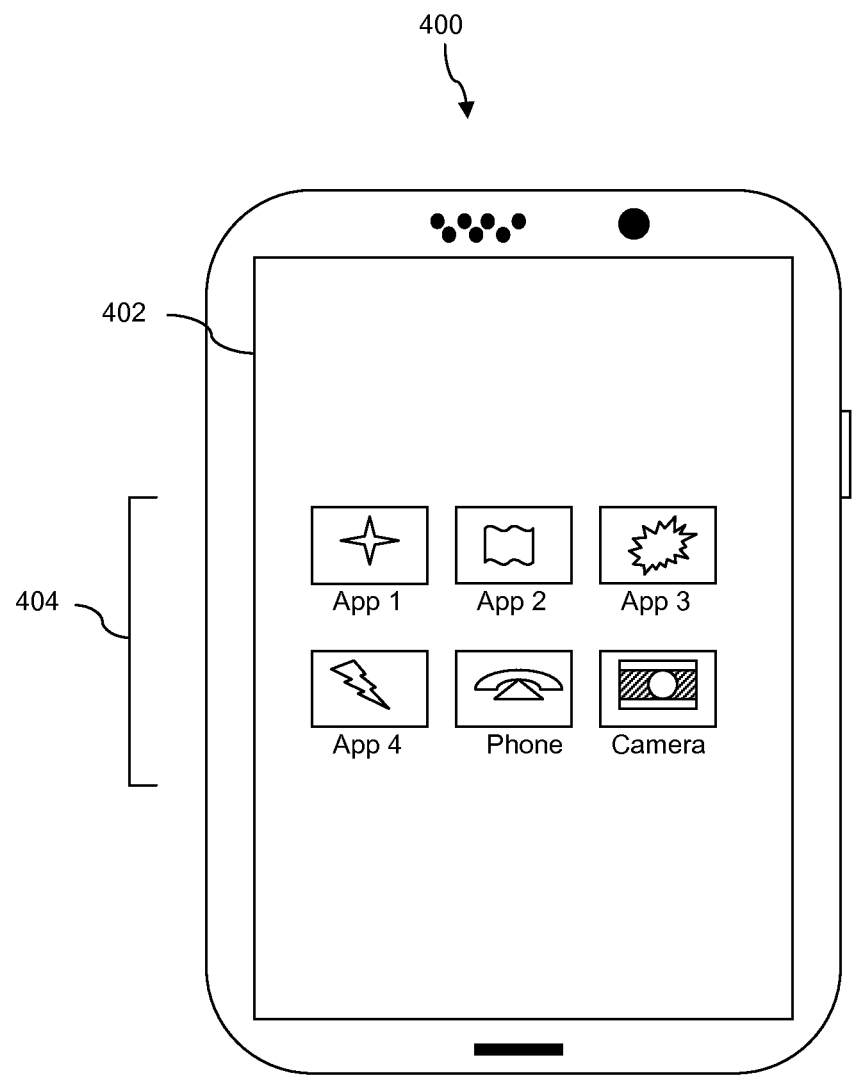
FIG. 5 is an illustration of a UE according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
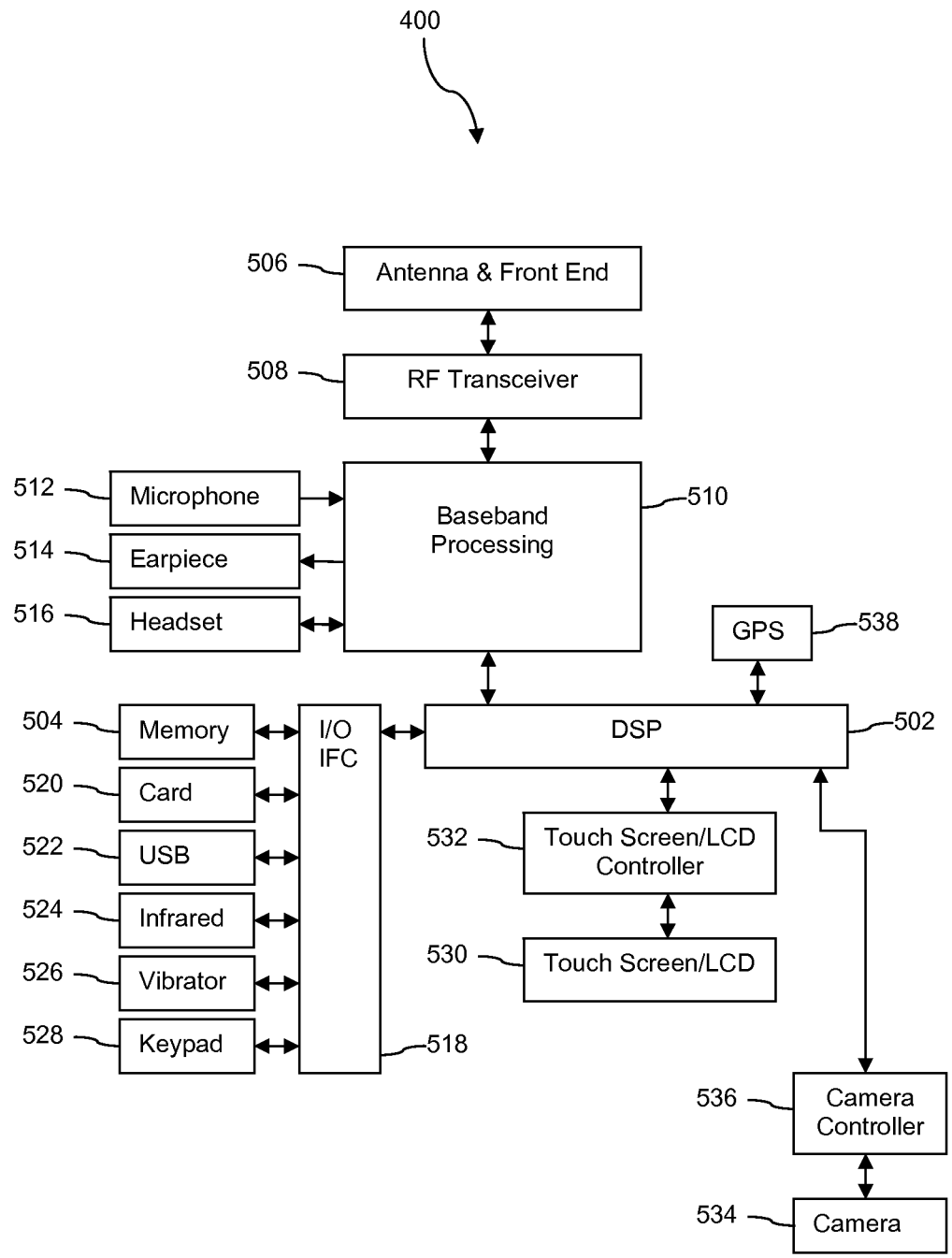
FIG. 6 is a block diagram of a hardware architecture of a UE according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an Institute of Electrical and Electronics Engineers (IEEE) 802.11 compliant wireless interface may enable the UE 400 to communicate wirelessly with other nearby handsets and/or wireless base stations.

The keypad 528 couples to the DSP 502 via the interface 518 to provide one mechanism for the user to make selections, enter information, and otherwise provide input to the UE 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the UE 400 to determine its position.

Figure 7A:
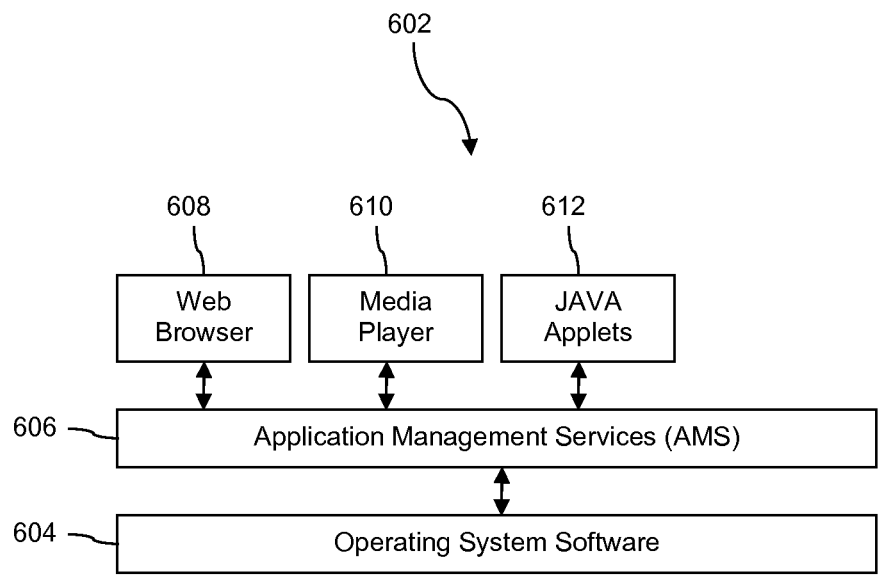
FIG. 7A is a block diagram of a software architecture of a UE according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
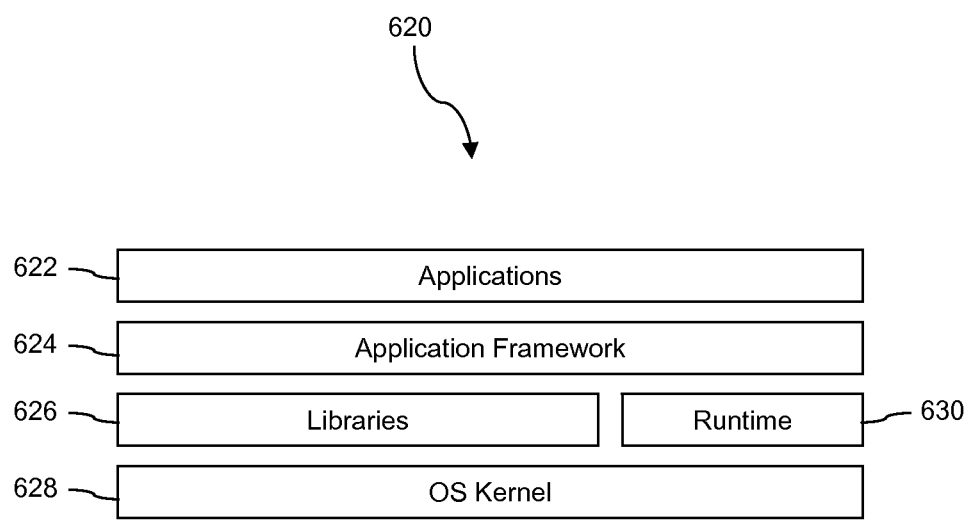
FIG. 7B is a block diagram of another software architecture of a UE according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
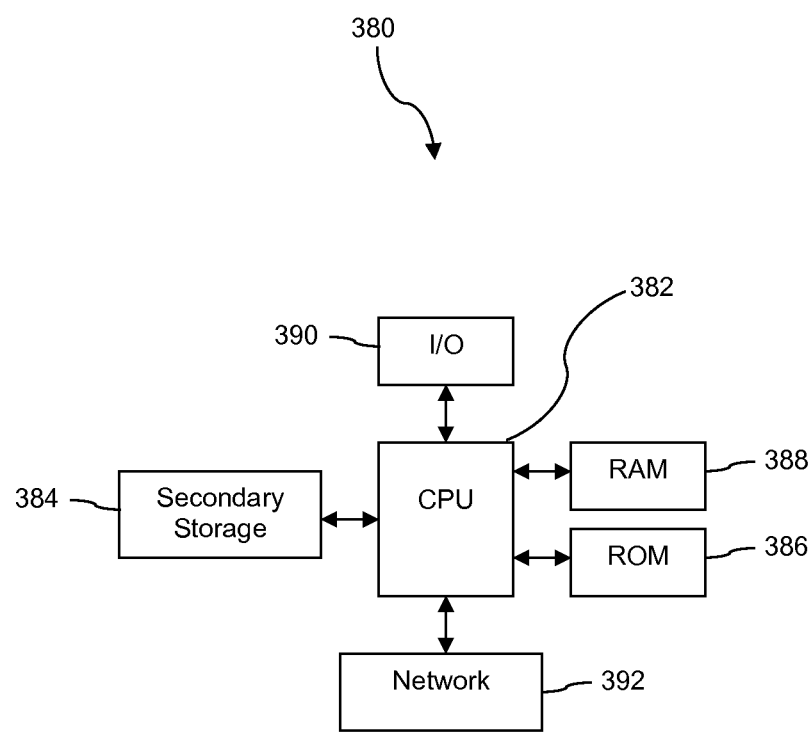
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of installing an application on a user equipment (UE), comprising:
    receiving a geometry file from a server by the UE, wherein the geometry file is specific to a model of the UE, wherein the geometry file comprises a size, a margin, and font of each thumbnail image;
    installing a plurality of application descriptors comprising a plurality of thumbnail images on the UE, where each of the application descriptors comprises a thumbnail image of an associated application and a uniform resource locator (URL) that identifies a location from which the associated application can be downloaded;
    presenting a first thumbnail image of a first one of the application descriptors for a predetermined period of time at a location on a display of the UE, where the first thumbnail image of the first one of the application descriptors is presented based on the geometry file, wherein the first thumbnail image comprises a mobile application installation shortcut that enables installation of a first application corresponding to the first thumbnail image upon selection of the first thumbnail image;
    removing the first thumbnail image of the first one of the application descriptors from the location on the display after the end of the predetermined period of time;
    presenting a second thumbnail image of a second one of the application descriptors for the predetermined period of time at the location on the display of the UE based on the geometry file after removal of presentation of the first thumbnail image of the first one of the application descriptor, where the second thumbnail image of the second one of the application descriptors is presented based on the geometry file, wherein the second thumbnail image comprises a mobile application installation shortcut that enables installation of a second application corresponding to the second thumbnail image upon selection of the second thumbnail image;
    receiving a selection input for one of the plurality of thumbnail images; and
    downloading and installing an application associated with the selection input of the one of the plurality of thumbnail images on the UE.

2. The method of claim 1, further comprising receiving a catalog that comprises the application descriptors, wherein the UE presents thumbnail images on the display of the UE one at a time selected from a predefined number of the application descriptors in the catalog.

3. The method of claim 2, wherein the UE presents thumbnail images from less than the six top listed application descriptors in the catalog.

4. The method of claim 2, further comprising moving the application descriptor associated with the application associated with the selection input of the one of the plurality of thumbnail images to a bottom listed position in the catalog.

5. The method of claim 2, wherein the predetermined period of time for displaying the thumbnail images is defined by the catalog.

6. The method of claim 1, wherein the applications associated with the application descriptors are user installable mobile applications.

7. The method of claim 1, wherein the application is downloaded from the server.

8. A user equipment (UE), comprising:
    a display;
    a processor;
    a non-transitory memory for storing computer executable instructions that, when executed by the processor, cause the processor to:
    receive a geometry file, stored in the non-transitory memory, wherein the geometry file is specific to a model of the UE, and wherein the geometry file comprises a size, a margin, and font of each thumbnail image;
    install a plurality of application descriptors comprising a plurality of thumbnail images, stored in the non-transitory memory, wherein each application descriptor comprises a thumbnail image of an associated application and a uniform resource locator (URL) that identifies a location from which the application can be downloaded;
    present a first thumbnail image of a first one of the application descriptors at a location on the display based on the geometry file for a predetermined period of time, wherein the first thumbnail image comprises a mobile application installation shortcut that enables installation of a first application corresponding to the first thumbnail image upon selection of the first thumbnail image;
    remove presentation of the first thumbnail image of the first one of the application descriptors from the location on the display after the end of the predetermined period of time;
    present a second thumbnail image of a second one of the application descriptors for the predetermined period of time at the location on the display based on the geometry file after removal of presentation of the first thumbnail image of the first one of the application descriptor, where the second thumbnail image of the second one of the application descriptors is presented based on the geometry file, wherein the second thumbnail image comprises a mobile application installation shortcut that enables installation of a second application corresponding to the second thumbnail image upon selection of the second thumbnail image;

receive a selection input for a currently displayed thumbnail image of one of the application descriptors; and download and installs an application associated with the selection input on the UE.

9. The UE of claim 8, wherein the plurality of application descriptors are stored in a catalog and wherein the thumbnail images of a subset of the application descriptors are presented one at a time in a sequence defined by location of the application descriptors in the catalog.

10. The UE of claim 9, wherein the sub-set of the application descriptors comprises a predefined number of the application descriptors located at the top of the catalog.

11. The UE of claim 9, wherein an application installation shortcut manager is stored in the non-transitory memory and periodically downloads the catalog to the UE.

12. The UE of claim 8, wherein the UE is one of a mobile phone, a smart phone, a laptop computer, a notebook computer, a tablet computer, and a wearable computer.

* * * * *